(No Model.)
C. W. CORNELL.
CLAMP.
No. 342,187. Patented May 18, 1886.
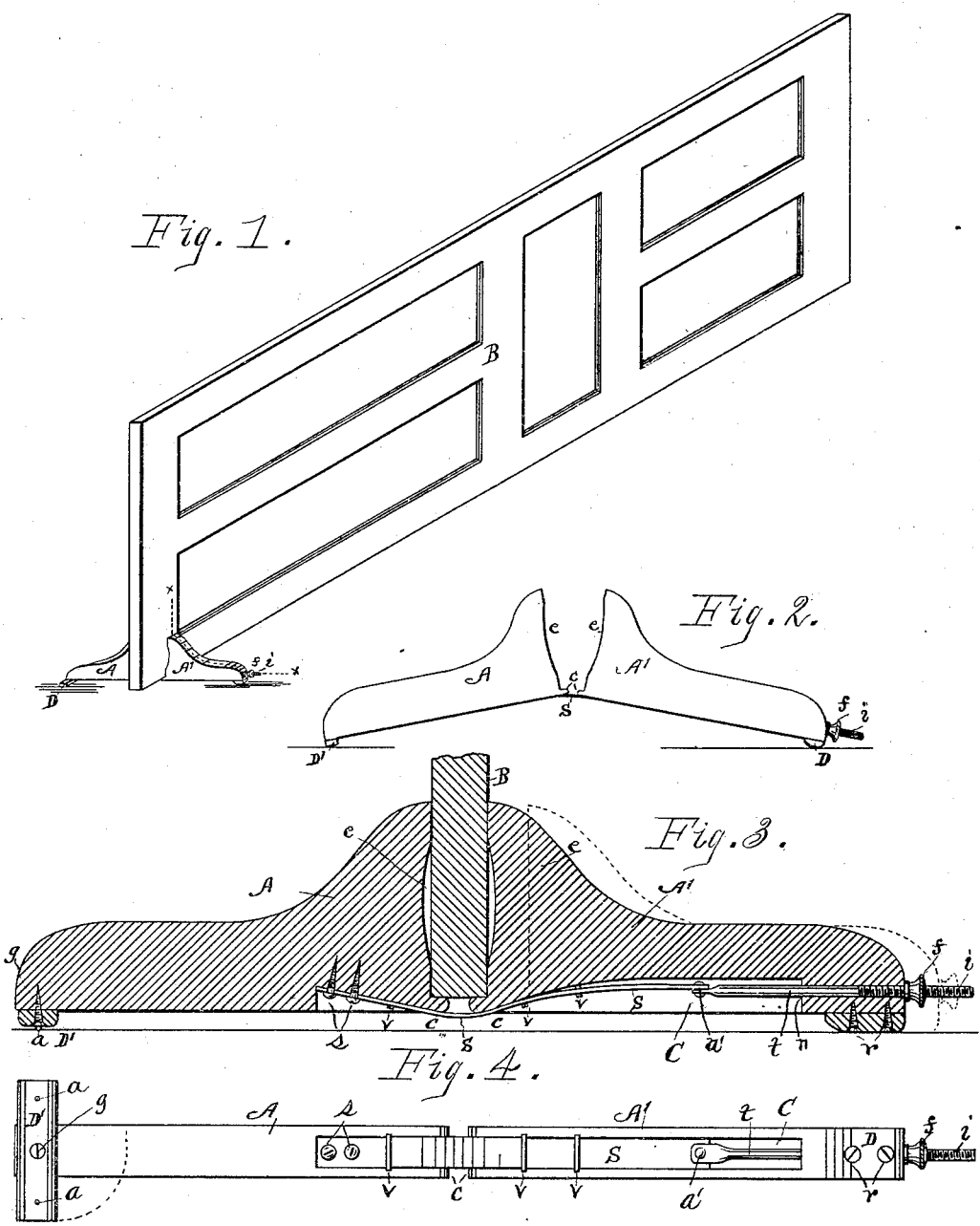
WITNESSES:
C. W. Russell
B. F. Wheeler
INVENTOR:
Charles W. Cornell
By Roscoe B. Wheeler
atty.

UNITED STATES PATENT OFFICE.

CHARLES W. CORNELL, OF WAUSEON, OHIO.

CLAMP.

SPECIFICATION forming part of Letters Patent No. 342,187, dated May 18, 1886.

Application filed January 12, 1886. Serial No. 188,352. (No model.)

*To all whom it may concern:*

Be it known that I, CHARLES W. CORNELL, a citizen of the United States, residing at Wauseon, in the county of Fulton and State of Ohio, have invented certain new and useful Improvements in Carpenters' Self-Acting Clamps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a device for supporting temporarily and in an upright position a door, window-sash, plank, or board, so as to readily enable a carpenter or operator to plane off or operate upon the upper edge surface of the article while being supported. I employ for the means of supporting such articles two jaws or supports, which lie upon the floor or plane surface and are separated at the facing ends, being joined together by a spring-band, being adapted to be adjusted toward and from each other upon the spring. Their facing ends, by said spring, when not in use, are thrown up from a horizontal position, spreading the ends of the supports, between which the material to be held is placed. The weight of the material causes the facing ends of said supports to drop, thereby impinging upon the article, thus holding the same in an upright position, as hereinafter set forth; and my invention consists in the arrangement of parts, as hereinafter set forth, and pointed out in the claims.

In the drawings forming a part of this specification, Figure 1 is an isometrical view of my invention as holding a door. Fig. 2 is a side elevation of the clamp in its normal position. Fig. 3 is a vertical longitudinal section on dotted line *x x* of Fig. 1. Fig. 4 is a bottom plan of clamp.

The base-supports or jaws A A' are made, preferably, of wood, to make the device light, or they may be made of metal. The part A', I provide with a fixed support at the free end, as shown at D. The part A is provided with a similar support, D', which I pivotally attach at the free end of said part by means of a screw or bolt, *g*, both supports being located on the under plane of the jaws. I provide the pivoted support with penetrating brads or points *a a*, which enter the floor or surface upon which it rests, thus preventing the sliding of the clamp while the carpenter or operator is planing or dressing off the upper surface of the article the clamp is supporting. The joining or facing ends of the jaws are each provided with a ledge or lug, *c*, upon which an edge of the material to be clamped is first placed. Said jaws are slightly concaved on their joining faces, as shown at *e e* of Figs. 2 and 3. I attach firmly to the jaw A, at the under edge, one end of the flat spring S, by means of screws or brads *s*. (See Figs. 3 and 4.) Said spring lies in a channel, C, formed in said jaws, having one end secured at *a'* to a rod or bolt, *t*, which passes through a hole at *n* through the free end of the jaw A'. (See Fig. 3.) Said rod is screw-threaded at *i*, and is provided with a thumb-nut, *f*, and by adjusting the nut on the rod the jaw A' may be moved back from the jaw A, as shown by dotted lines in Fig. 3, when a thicker door, as B, or other article may be inserted and supported between the jaws, as shown clearly in Figs. 1 and 3; and as a means of confining the spring S within the channel C of the jaws I pass over the spring metallic staples *v*, their ends being driven into the jaws. The staples *v v* of the jaw A' allow the spring to slide over them freely when moving the jaws toward or from each other, as hereinbefore stated.

The operations are as follows: The clamp being in the position of Fig. 2, the operator places the lower edge of the door B on the ledges C C of the jaws, when the jaws at the center drop down and toward each other until their vertical faces meet the door, as shown in Figs. 1 and 3. Should the jaws fail to stand flush with the vertical edges of the door, they may be adjusted by turning the thumb-nut *f* on the bolt *t*. The jaws should be so adjusted that when the door B is clamped it should stand in a vertical position. The faces of the jaws will then stand on a vertical line and at right angles to the horizontal, and to remove the door from the clamp it is simply raised up, when the spring will throw the joining ends of the clamp upward and backward to its normal position, as shown in Fig. 2, when the clamp will be set ready to receive another door or like article.

Having thus fully set forth my present invention, what I claim as new, and desire to secure by Letters Patent, is—

1. In a device for the purposes set forth, the combination of the jaws, each provided with a ledge at the joining ends, said jaws coupled together by means of the spring, and having the rod and thumb-nut for adjusting said jaws, as and for the purposes specified.

2. In a device for the purposes set forth, the combination of the jaws, each provided with a support at the free end and a lug at the joining ends, said jaws coupled together by means of the spring, and the rod and thumb-nut for adjusting said jaws, substantially as specified.

3. In an adjusting-clamp, the combination of the jaws A A', each provided with a support at the free ends, and a ledge, c, at the facing ends, and having the spring S attached to the under face of the jaw A at one end, the other end attached to the bolt t, said bolt passing through the free end of the jaw A' and provided with the thumb-nut f, said spring housed within the channels of said jaws, as and for the purposes specified.

In testimony whereof I affix my signature in presence of two witnesses.

CHARLES W. CORNELL.

Witnesses:
R. B. WHEELER,
C. W. RUSSELL.